(12) United States Patent
Hall et al.

(10) Patent No.: US 10,359,097 B2
(45) Date of Patent: Jul. 23, 2019

(54) SILENT CHAIN PROFILE FOR LINEAR MOVEMENT

(71) Applicants: David R. Hall, Provo, UT (US); Jackson Priddis, Orem, UT (US); Andrew Priddis, Mapleton, UT (US); Eimi Priddis, Mapleton, UT (US)

(72) Inventors: David R. Hall, Provo, UT (US); Jackson Priddis, Orem, UT (US); Andrew Priddis, Mapleton, UT (US); Eimi Priddis, Mapleton, UT (US)

(73) Assignee: Hall Labs LLC, Provo, UT (US)

( * ) Notice: Subject to any disclaimer, the term of this patent is extended or adjusted under 35 U.S.C. 154(b) by 235 days.

(21) Appl. No.: 15/175,488

(22) Filed: Jun. 7, 2016

(65) Prior Publication Data
US 2017/0350472 A1 Dec. 7, 2017

(51) Int. Cl.
*F16G 13/04* (2006.01)
*F16G 13/06* (2006.01)

(52) U.S. Cl.
CPC .......... *F16G 13/04* (2013.01); *F16G 13/06* (2013.01)

(58) Field of Classification Search
CPC . F16G 13/04; F16H 7/06; F16H 55/30; F16H 2055/306; F16H 55/08
USPC ................................. 474/212, 213
See application file for complete search history.

(56) References Cited

U.S. PATENT DOCUMENTS

| | | | | |
|---|---|---|---|---|
| 1,140,319 | A * | 5/1915 | Van Houten | F16H 7/06 305/202 |
| 2,223,314 | A * | 11/1940 | Cumfer | F16G 13/04 474/207 |
| 5,588,926 | A * | 12/1996 | Mott | F16G 13/04 474/212 |
| 5,967,926 | A * | 10/1999 | Kozakura | F16H 7/06 474/206 |
| 5,989,140 | A * | 11/1999 | Ichikawa | F16H 7/06 474/148 |
| 6,112,510 | A * | 9/2000 | Ichikawa | F16G 13/04 474/212 |
| 6,155,944 | A * | 12/2000 | Matsuda | F16G 13/04 474/157 |
| 6,168,543 | B1 * | 1/2001 | Matsuda | F16G 13/04 474/157 |
| 6,171,209 | B1 * | 1/2001 | Matsuda | F16G 13/04 474/212 |
| 6,334,829 | B1 * | 1/2002 | Saito | F16G 13/04 474/213 |
| 6,387,003 | B2 * | 5/2002 | Horie | B21L 15/005 474/212 |

(Continued)

*Primary Examiner* — Henry Y Liu

(57) ABSTRACT

The invention is a silent chain with a profile capable of corresponding with the profiles of both sprockets and racks. The purpose of the invention is to convert rotational motion to linear motion in a way that is superior to the traditional rack and pinion device by allowing for more surface area contact with the rack through the use of, rather than a pinion, a silent chain that is capable of engaging with a rack. The invented silent chain comprises link plates of a particular shape stacked in alternating rows and joined together by connecting pins in such a way as to be bendable. The link plates are shaped such that the teeth of the link plates are offset when the chain is straightened, which allows the profile of the silent chain to correspond with the profiles of both sprockets and racks.

19 Claims, 12 Drawing Sheets

(56) References Cited

U.S. PATENT DOCUMENTS

| | | | | |
|---|---|---|---|---|
| 6,440,022 B1* | 8/2002 | Ichikawa | F16G 13/04 | 474/161 |
| 6,485,385 B2* | 11/2002 | Shimaya | F16G 13/04 | 474/213 |
| 6,533,107 B2* | 3/2003 | Suzuki | F16G 13/04 | 198/834 |
| 6,589,127 B1* | 7/2003 | Horie | B21L 15/005 | 474/212 |
| 6,969,332 B2* | 11/2005 | Sakamoto | F16G 13/04 | 474/212 |
| 7,056,248 B2* | 6/2006 | Butterfield | F16G 13/04 | 474/212 |
| 7,229,375 B2* | 6/2007 | Hummel | F16G 13/04 | 474/213 |
| 7,404,778 B2* | 7/2008 | Butterfield | F16G 13/04 | 474/212 |
| 7,419,449 B2* | 9/2008 | Tohara | F16G 13/02 | 474/212 |
| 8,529,389 B2* | 9/2013 | Young | F16G 13/04 | 474/157 |
| 8,628,440 B2* | 1/2014 | Young | F16H 7/06 | 474/152 |
| 8,672,786 B2* | 3/2014 | Young | F16G 13/04 | 474/206 |
| 8,888,632 B2* | 11/2014 | Yasuta | F16G 13/04 | 474/206 |
| 8,888,634 B2* | 11/2014 | Junig | F16G 13/04 | 474/212 |
| 8,979,691 B2* | 3/2015 | Tokita | F16G 13/04 | 474/212 |
| 9,017,199 B2* | 4/2015 | Miyanaga | F16G 13/04 | 474/213 |
| 9,377,082 B2* | 6/2016 | Young | F16G 13/04 | |
| 2001/0004615 A1* | 6/2001 | Horie | B21L 15/005 | 474/214 |
| 2002/0155911 A1* | 10/2002 | Hummel | F16G 13/04 | 474/212 |
| 2009/0036245 A1* | 2/2009 | Ogo | F16G 13/04 | 474/212 |
| 2009/0192000 A1* | 7/2009 | Junig | F16G 13/04 | 474/215 |
| 2010/0222170 A1* | 9/2010 | Yasuta | F16G 13/04 | 474/140 |
| 2011/0183799 A1* | 7/2011 | Young | F16G 13/04 | 474/148 |
| 2011/0224041 A1* | 9/2011 | Tokita | F16G 13/04 | 474/213 |
| 2011/0245002 A1* | 10/2011 | Young | F16H 7/06 | 474/157 |
| 2013/0267364 A1* | 10/2013 | Motoshima | F16G 13/04 | 474/213 |

* cited by examiner

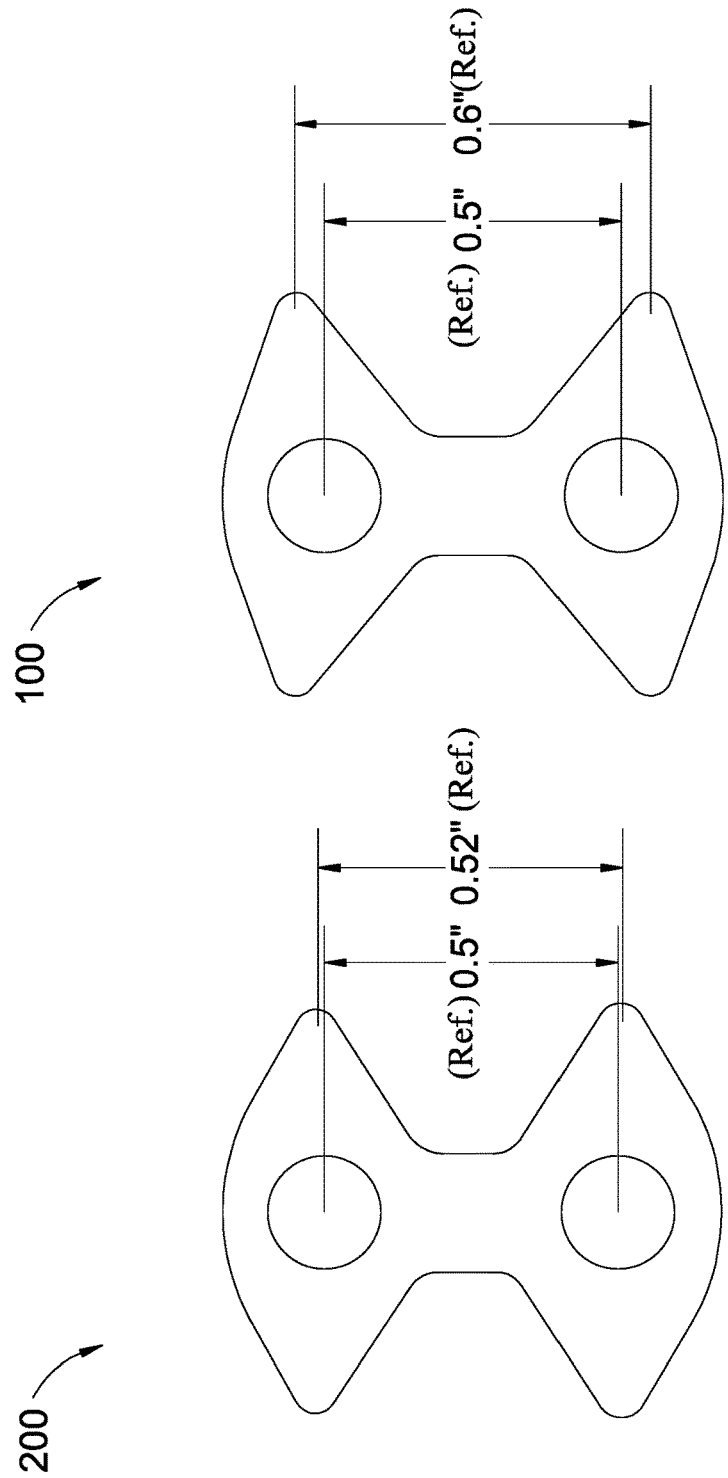

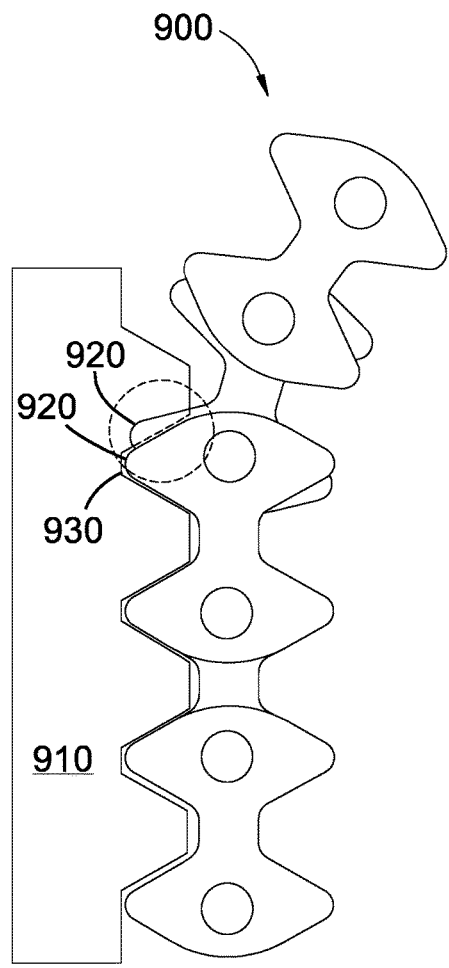 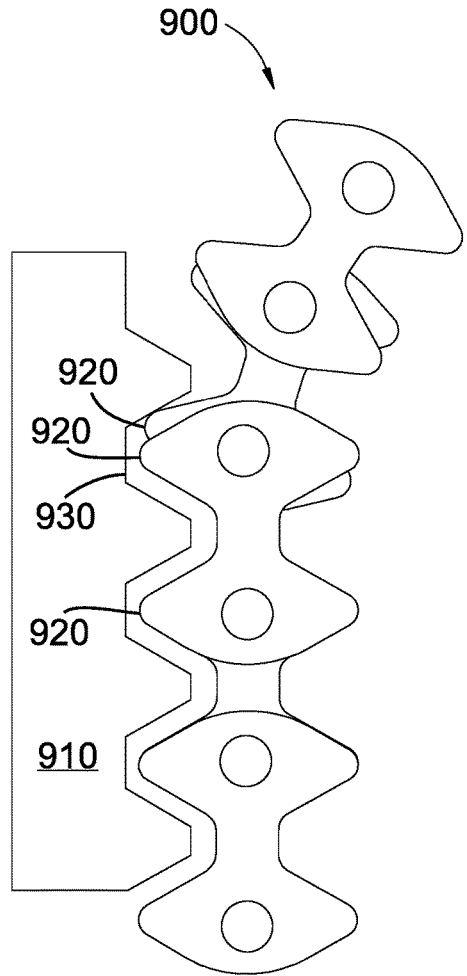
FIG. 9A  FIG. 9B
(Prior Art)
FIG. 9

SILENT CHAIN PROFILE FOR LINEAR MOVEMENT

CROSS-REFERENCES

Technical Field

This invention relates to a silent chain, and more specifically to a silent chain profile for linear motion.

Background

The lifting capacity of an average person amounts to not more than a few hundred pounds. For this reason, people have turned for centuries to mechanical means of lifting heavy items. Some of the means devised include pulley systems, cranes, scissor lifts, or linear actuators. One type of linear actuator of particular interest here is a rack and pinion device.

Rack and pinion devices are configured to convert rotational motion to linear motion. They are often used for creating horizontal linear motion, such as in transport, packaging, and assembly machines, but rack and pinion devices can also be used for vertical linear motion. An advantage of using a rack and pinion device, as opposed to other devices like cranes or pulleys, is that the rack and pinion device can drive and therefore lift from the bottom. However, when lifting heavy items vertically, rack and pinion devices have one significant disadvantage.

Rack and pinion devices normally have only a few points of contact between the rack and the pinion. If a rack and a pinion have contact at only a few points, those points of contact may be put under undue amounts of stress when lifting, which could cause the rack and pinion device to fail. In contraptions in which reliability or safety are significant concerns, such as in an elevator, taking chances with parts that might break under load could lead to disastrous results. This problem is sometimes solved by increasing the size and, therefore, the load capacity of the rack and pinion, but larger parts are harder to manufacture, require more space, cost more, and might require larger motors, all of which lead to decreased efficiency. This is especially undesirable if trying to create a green or sustainable product.

The disadvantage of a rack and pinion device could conceivably be resolved through the use of a silent chain in place of a pinion. Silent chains, like pinions, are generally built for rotational motion. However, if the rotational motion of a silent chain could be converted to linear motion, because of the longer profile of a silent chain, numerous points of contact between a silent chain and a rack could be established, rather than the few points of contact established between a pinion and a rack.

Unfortunately, the profile of a typical silent chain is designed to engage only on one side, on the inner side, with a sprocket. Sometimes silent chains will have internal and external profiles, so that they can engage with sprockets inside and outside the silent chain. However, the profile of a silent chain cannot engage with a rack. More especially, a silent chain profile cannot engage with a rack on the outside and a motor-driven sprocket on the inside.

In light of the foregoing, what is needed is a silent chain with a profile that would allow it to engage with a rack. In particular, the silent chain profile should allow the chain to engage with both a sprocket on the inside and a rack on the outside, so that the silent chain's rotational motion can be converted to linear motion.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow a chain profile to configure to a linear rack.

Consistent with the foregoing, a silent chain is disclosed. In one embodiment, the silent chain comprises a plurality of link plates, each link plate having at least four teeth and a first pin hole and a second pin hole. The link plates are stacked in alternating rows, where the first pin holes of a first row selection of link plates are aligned with the second pin holes of a second row selection of link plates. The silent chain further comprises a plurality of connecting pins inserted through the first pin holes and the second pin holes of the link plates to join the link plates together in such a way as to be bendable. The teeth of the link plates are shaped in such a way that the teeth of the first row selection of link plates and the teeth of the second row selection of link plates are offset when the silent chain is straightened, so that a profile of the silent chain can correspond with a profile of a sprocket and a profile of a rack. In some embodiments, the silent chain also comprises center guide link plates. The center guide link plates, which are stadium-shaped and have no teeth, are positioned centrally between the rows of link plates to prevent the silent chain from slipping.

BRIEF DESCRIPTION OF THE DRAWINGS

A more particular description of the invention briefly described above is made below by reference to specific embodiments depicted in drawings included with this application, in which:

FIG. 2A depicts an exploded view of a link plate of a prior art silent chain;

FIG. 2B depicts an exploded view of a link plate of the silent chain built in accordance with the invention;

FIG. 9A depicts a perspective view of a prior art silent chain profile not engaging with a profile of a rack;

FIG. 9B depicts a perspective view of a prior art silent chain profile not engaging with a profile of a rack;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
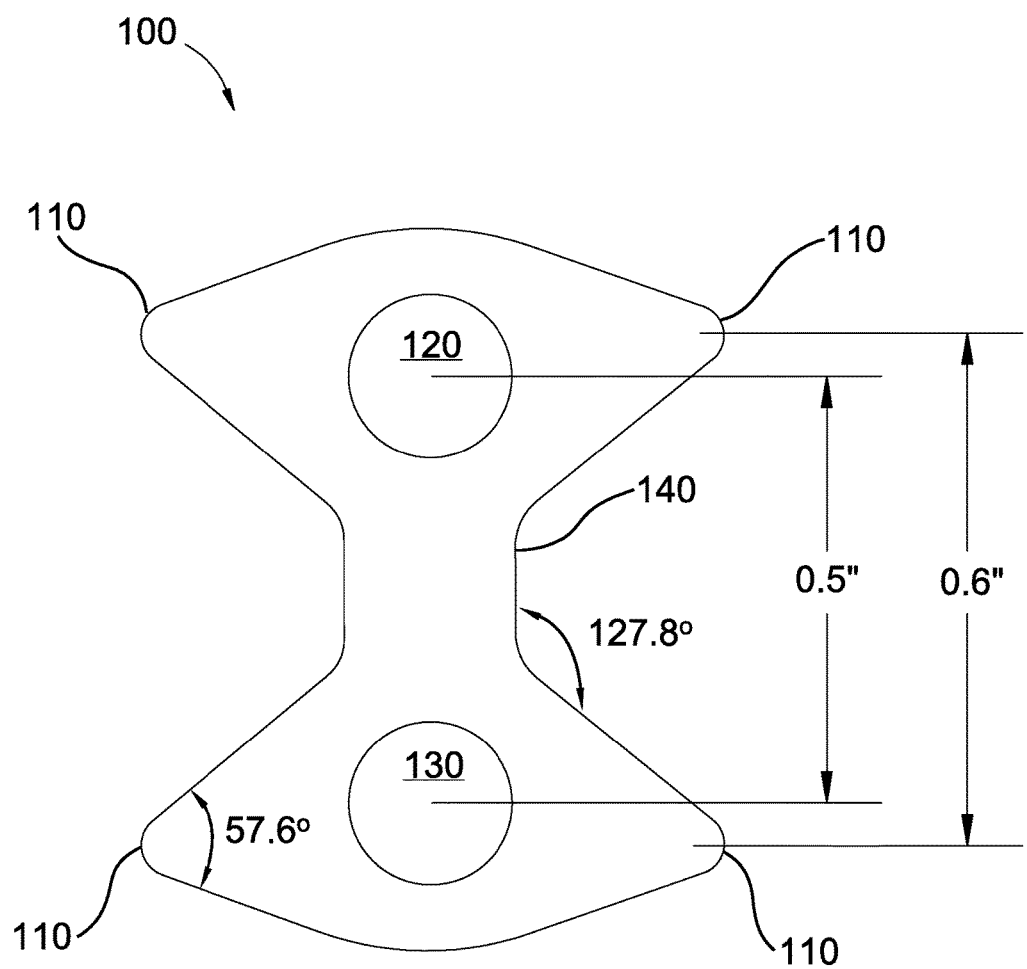
FIG. 1 depicts an exploded view of a link plate.

FIG. 1 depicts a single link plate 100. Each link plate 100 has at least four teeth 110 and a first pin hole 120 and a second pin hole 130. In one embodiment, each link plate is bow-shaped. In one embodiment, a tip of each of the teeth 110 of the link plate 100 forms an angle between about thirty and eighty degrees, preferably an angle between about fifty-five and sixty degrees. Each of the teeth 110 of the link plate 100 extends from a vertical waist 140 of each link plate 100 at an angle between about one hundred and one hundred fifty degrees, preferably an angle of between about one hundred twenty-five and one hundred thirty degrees. A distance between central pivot points within each first pin hole 120 and each second pin hole 130 measures 0.5 inches. A distance between central points of two teeth 110 that are pointing a same direction measures between about 0.345 and 0.79 inches, preferably measuring between about 0.49 and 0.68 inches, more preferably measuring between about 0.55 and 0.645 inches. These measurements offset the link plates 100 when stacked on top of each other in a straight line.

FIG. 2A and FIG. 2B depict a comparison between a link plate 200 of a prior art silent chain and the link plate 100 of the silent chain built in accordance with the invention. FIG. 2A depicts the link plate 200 of a prior art silent chain. There are two important measurements of note on link plate 200. A distance 210 between central pivot points within each first pin hole and each second pin hole measures about 0.5 inches. A distance 220 between central points of two teeth pointing a same direction measures about 0.52 inches. The difference between these two measurements is very small. Therefore, when two or more of these link plates 200 of a prior art silent chain are stacked on top of each other in a straight line, the teeth of each link plate nearly align. FIG. 2B depicts the link plate 100 of the silent chain built in accordance with the invention. Again, in one embodiment, a distance 230 between central pivot points within each first pin hole and each second pin hole measures about 0.5 inches. The distance 240 between central points of two teeth pointing the same direction measures between about 0.345 and 0.79 inches, preferably measuring between about 0.49 and 0.68 inches, more preferably measuring between about 0.55 and 0.645 inches. The difference between these two measurements is larger than the difference between the two corresponding measurements of the link plates 200 of a prior art silent chain. Therefore, when two or more of these link plates 100 of the silent chain built in accordance with the invention are stacked on top of each other in a straight line, the teeth of each link plate are offset.

Figure 3A:
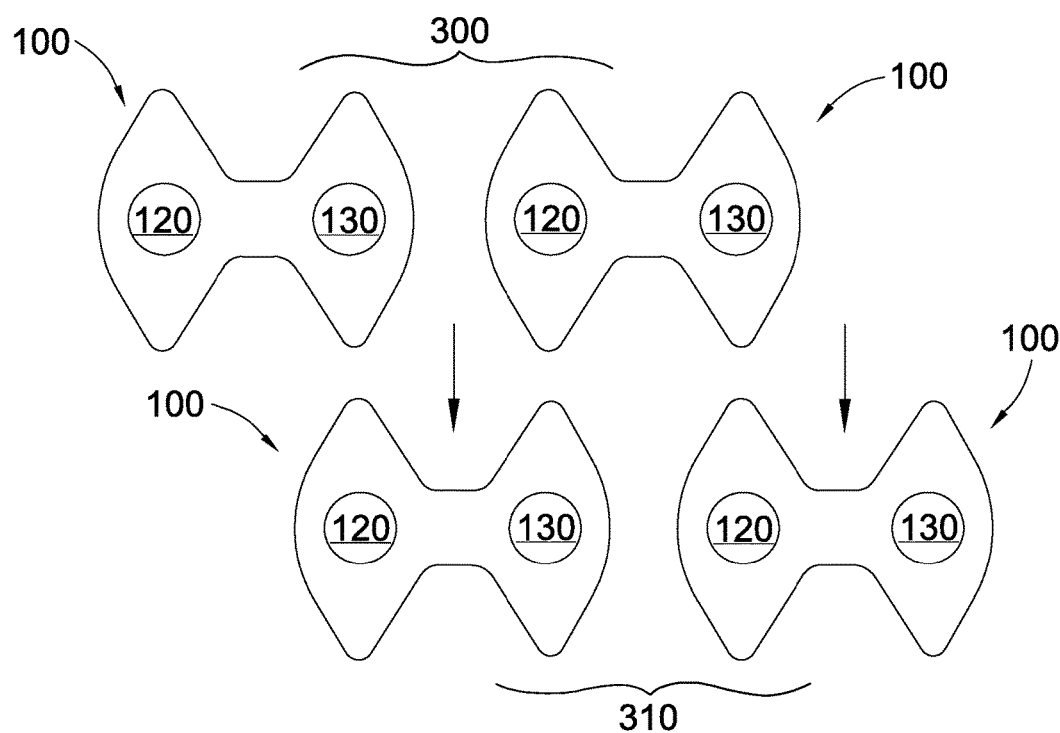
FIG. 3A depicts an exploded view of link plates arranged for stacking in alternating rows.
Figure 3B:
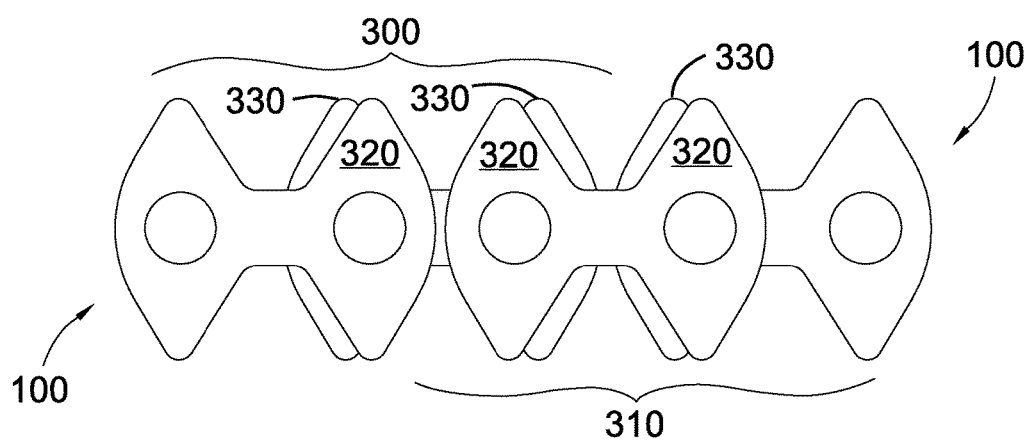
FIG. 3B depicts an exploded view of link plates stacked in alternating rows.

FIG. 3A and FIG. 3B depict the link plates 100 of the silent chain built in accordance with the invention stacked in alternating rows. In FIG. 3A, the first pin holes 120 of a first row selection 300 of link plates 100 are aligned with the second pin holes 130 of a second row selection 310 of link plates 100. In FIG. 3B, the link plates 100 are stacked on top of each other. As depicted in FIG. 3B, the teeth of the link plates 100 are shaped in such a way that the teeth 320 of the first row selection 300 of link plates 100 and the teeth 330 of the second row selection 310 of link plates 100 are offset when the silent chain is straightened. Though the teeth are offset when the silent chain is straightened, the upper teeth align when it is bent. This allows the profile of the silent chain to correspond with a profile of a rack, which is a linear gear interface, and also with a profile of a sprocket, which is a circular gear interface. In one embodiment, the silent chain has eight alternating rows of link plates. In other embodiments, the silent chain has two, three, four, five, six, seven, nine, ten, or more alternating rows of link plates. A large number of alternating rows makes the silent chain stronger.

Figure 4A:
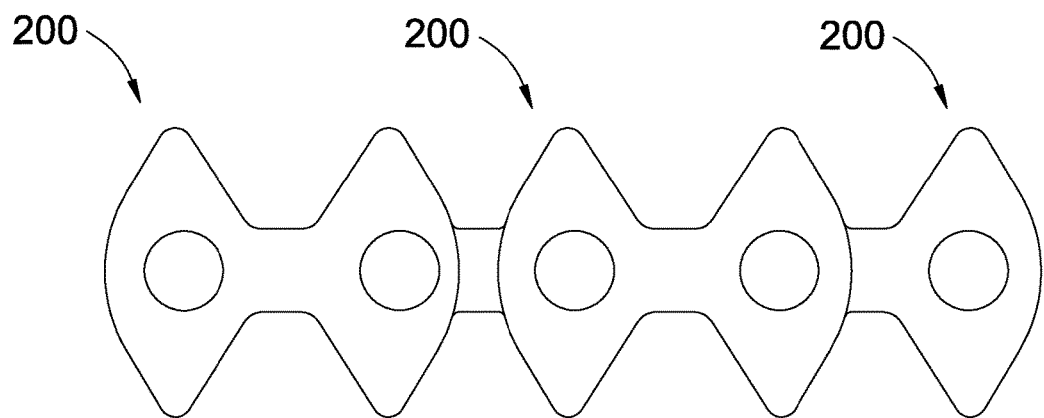
FIG. 4A depicts an exploded view of link plates of a prior art silent chain stacked in alternating rows.
Figure 4B:
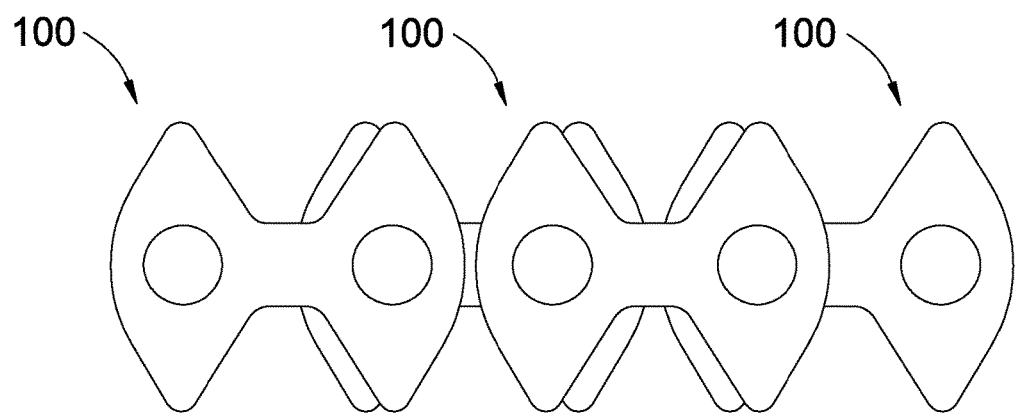
FIG. 4B depicts an exploded view of link plates of a silent chain built in accordance with the invention stacked in alternating rows.

FIG. 4A and FIG. 4B depict a comparison of the link plates 200 of a prior art silent chain stacked in alternating rows and the link plates 100 of the silent chain built in accordance with the invention stacked in alternating rows. FIG. 4A depicts the link plates 200 of a prior art silent chain stacked in alternating rows. When the link plates 200 are stacked on top of each other in a straight line, the teeth of each link plate 200 nearly align. FIG. 4B depicts the link plates 100 of a silent chain built in accordance with the invention stacked in alternating rows. When the link plates 100 are stacked on top of each other in a straight line, the teeth of each link plate are offset.

Figure 5:
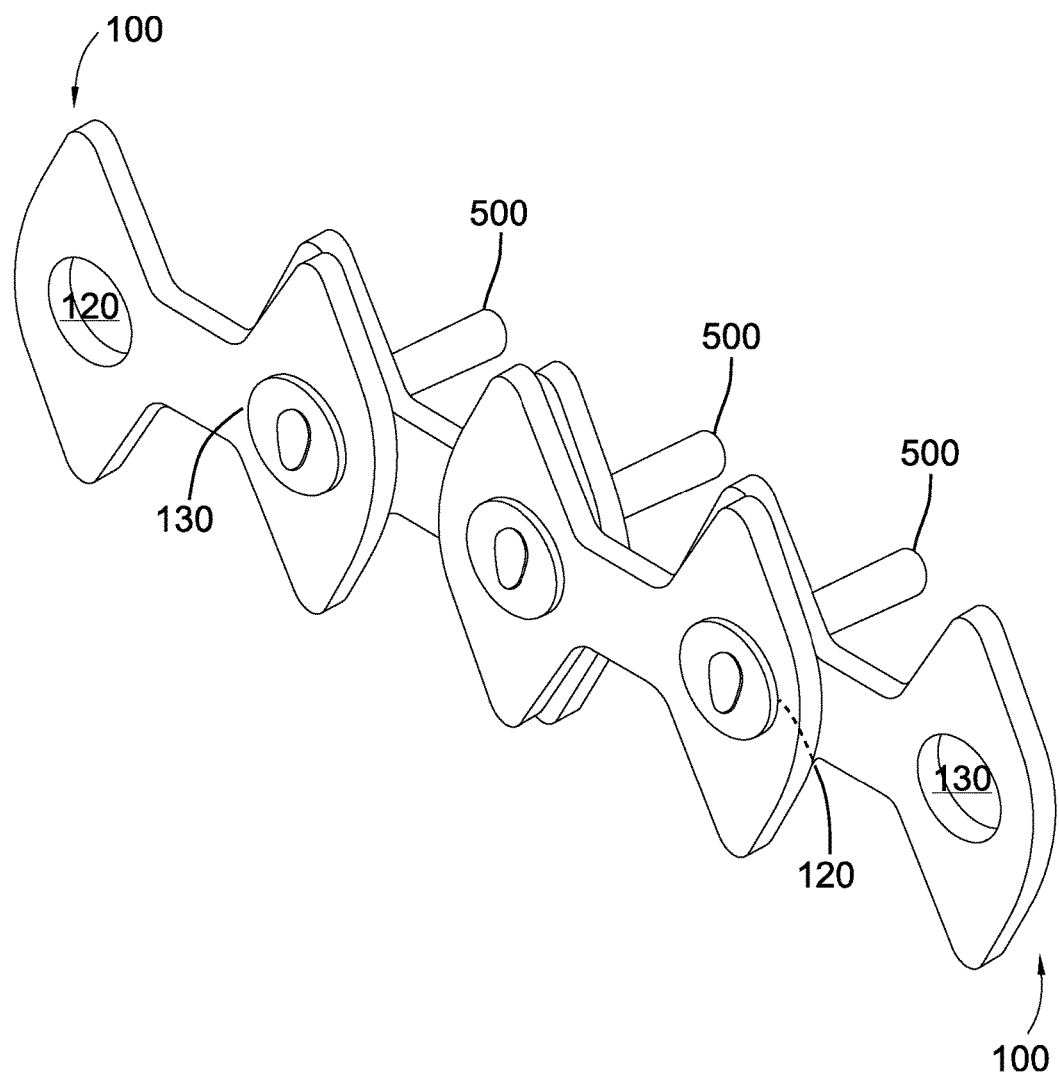
FIG. 5 depicts an exploded view of connecting pins inserted through the first pin holes and the second pin holes of the link plates.

FIG. 5 depicts a plurality of connecting pins 500 inserted through the first pin holes 120 and the second pin holes 130 of the link plates 100 of the silent chain built in accordance with the invention, to join the link plates together in such a way as to make the silent chain bendable. In one embodiment, the connecting pins are rocker pins. In one embodiment, the pins are secured with washers. The washers are placed over top and bottom ends of the connecting pins 500, and the ends of the connecting pins 500 are smashed down to hold the connecting pins 500 in place. FIG. 5 depicts only two alternating rows of link plates 100. In one embodiment, however, the silent chain has eight alternating rows of link plates. In other embodiments, the silent chain has two, three, four, five, six, seven, nine, ten, or more alternating rows of link plates.

Figure 6:
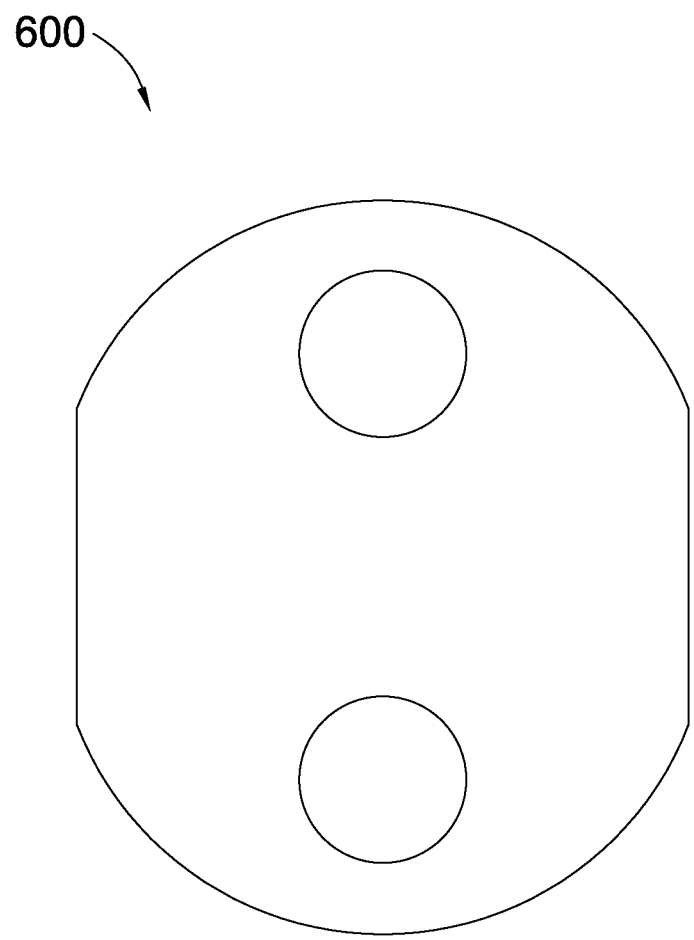
FIG. 6 depicts an exploded view of a center guide link plate.

FIG. 6 depicts a center guide link plate 600. The center guide link plates 600 are stadium-shaped and have no teeth. The center guide link plates 600 are positioned centrally between the rows of link plates. They are designed to align with center guide indentations on a rack, so that the silent chain built in accordance with the invention is guided and prevented from slipping.

Figure 7:
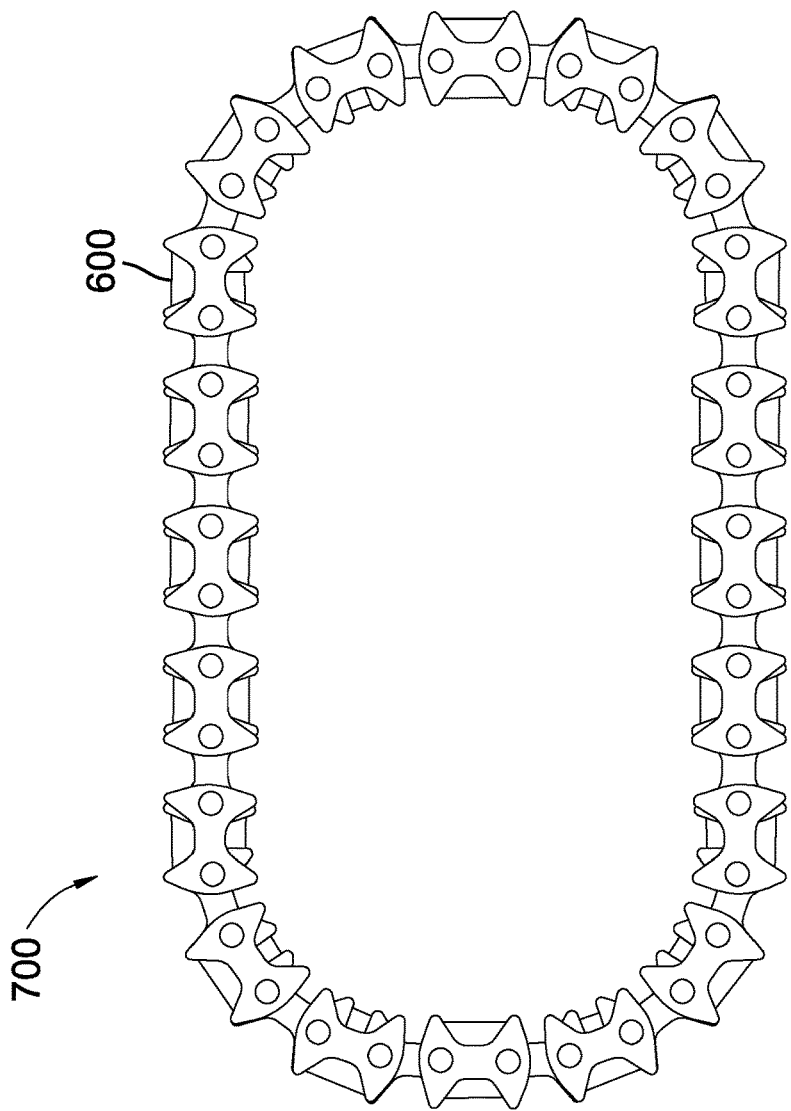
FIG. 7A depicts a perspective view of a complete silent chain built in accordance with the invention.
FIG. 7B depicts a side view of a silent chain built in accordance with the invention.

FIG. 7A and FIG. 7B depict a complete silent chain 700 built in accordance with the invention. The chain has a variable length and a variable amount of alternating link plates. FIG. 7A depicts one embodiment, in which the center guide link plates 600 can be seen centrally positioned between alternating rows of link plates. FIG. 7B depicts a side view of silent chain 700. In one embodiment, there are eight alternating rows of link plates. In other embodiments, the silent chain has two, three, four, five, six, seven, nine, ten, or more alternating rows of link plates.

Figure 8:
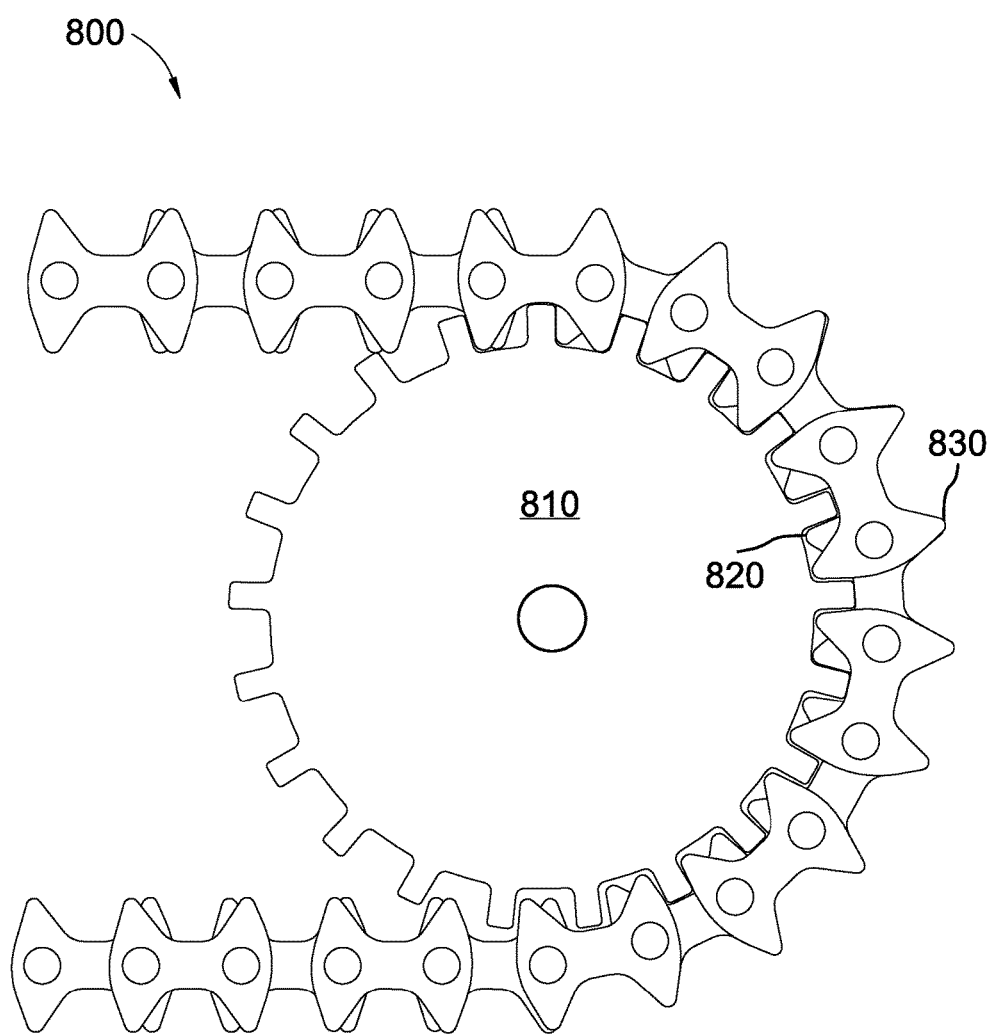
FIG. 8 depicts a perspective view of the silent chain profile corresponding with a profile of a sprocket.

FIG. 8 depicts the silent chain 800 built in accordance with the invention engaged with a sprocket 810. The profile of the silent chain 800 corresponds with the profile of the sprocket 810. The teeth of the link plates of silent chain 800 are shaped in such a way that the teeth of each link plate are offset when the silent chain 800 is straightened. When the silent chain 800 is bent, just as with prior art silent chains, lower teeth 820 are drawn apart, and so they continue to be offset. However, unlike prior art silent chains, when the silent chain 800 built in accordance with the invention is bent, upper teeth 830 align. Still, because of the amount that the lower teeth 820, which are the teeth that engage with the sprocket 810, offset when the silent chain 800 is bent, the profile of the silent chain 800 built in accordance with the invention corresponds with a profile of sprocket 810, functioning just like prior art silent chains.

FIG. 9A and FIG. 9B depict a prior art silent chain profile 900 not engaging with a profile of a rack 910. FIG. 9A demonstrates a problem that is encountered when trying to interface a prior art silent chain 900 with a rack 910. The circle in FIG. 9A draws attention to the area of problem. In a prior art silent chain 900, as the silent chain 900 is bent so that the teeth 920 approach the rack 910 to engage with the rack 910, the teeth 920 draw apart, such that they are offset. Because the teeth 920 draw apart such that they are offset, the teeth become too big to fit within a groove 930 of the rack 910. Therefore, the teeth 920 cannot fit within the groove 930, and they cannot engage with the rack 910. This problem could conceivably be corrected by increasing the size of the groove 930 in the rack 910. However, FIG. 9B depicts what happens when the size of the groove 930 in the rack 910 is increased. When the silent chain 900 is bent, the teeth 920 are drawn apart, such that they are offset. Because of the expanded size of the groove 930 in the rack 910, the teeth fit within the groove 930 as the teeth approach the groove 930. However, after the silent chain 900 is straightened, the teeth 920 align again. When the teeth 920 align, they are too small to fit within the groove 930. Consequently, the teeth 920 are unable to engage with the rack 910. In order to correct this problem, a silent chain profile is needed in which the teeth 920 align as they are bent to approach the rack 920, and in which the teeth 920 are drawn apart such that they are offset when the silent chain 900 is straightened.

Figure 10:
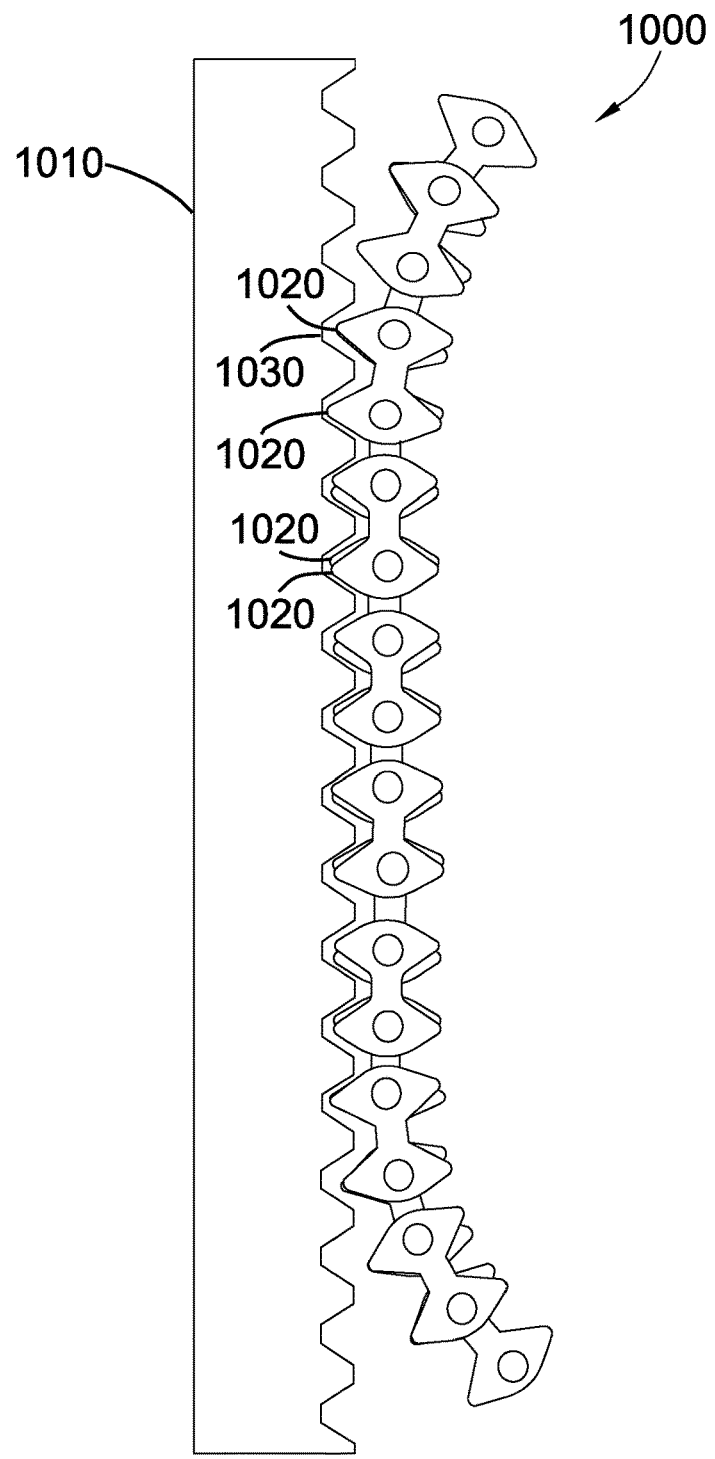
FIG. 10 depicts a perspective view of the invented silent chain profile engaging with a profile of a rack.

FIG. 10 depicts the profile of silent chain 1000 built in accordance with the invention engaging with a profile of rack 1010. The profile of silent chain 1000 corresponds with the profile of rack 1010. The teeth 1020 of the link plates of silent chain 1000 are shaped in such a way that the teeth are offset when the silent chain 1000 is straightened. However, as the silent chain 1000 is bent so that the teeth 1020 approach the rack 1010 to engage with the rack 1010, the teeth 1020 align. Because the teeth 1020 align, the teeth become small enough to fit within a groove 1030 of the rack 1010. After the silent chain 1000 is straightened, the teeth 1020 are drawn apart, such that they return to their original offset position. In this way, the teeth 1020 are able to engage with rack 1010.

Figure 11:
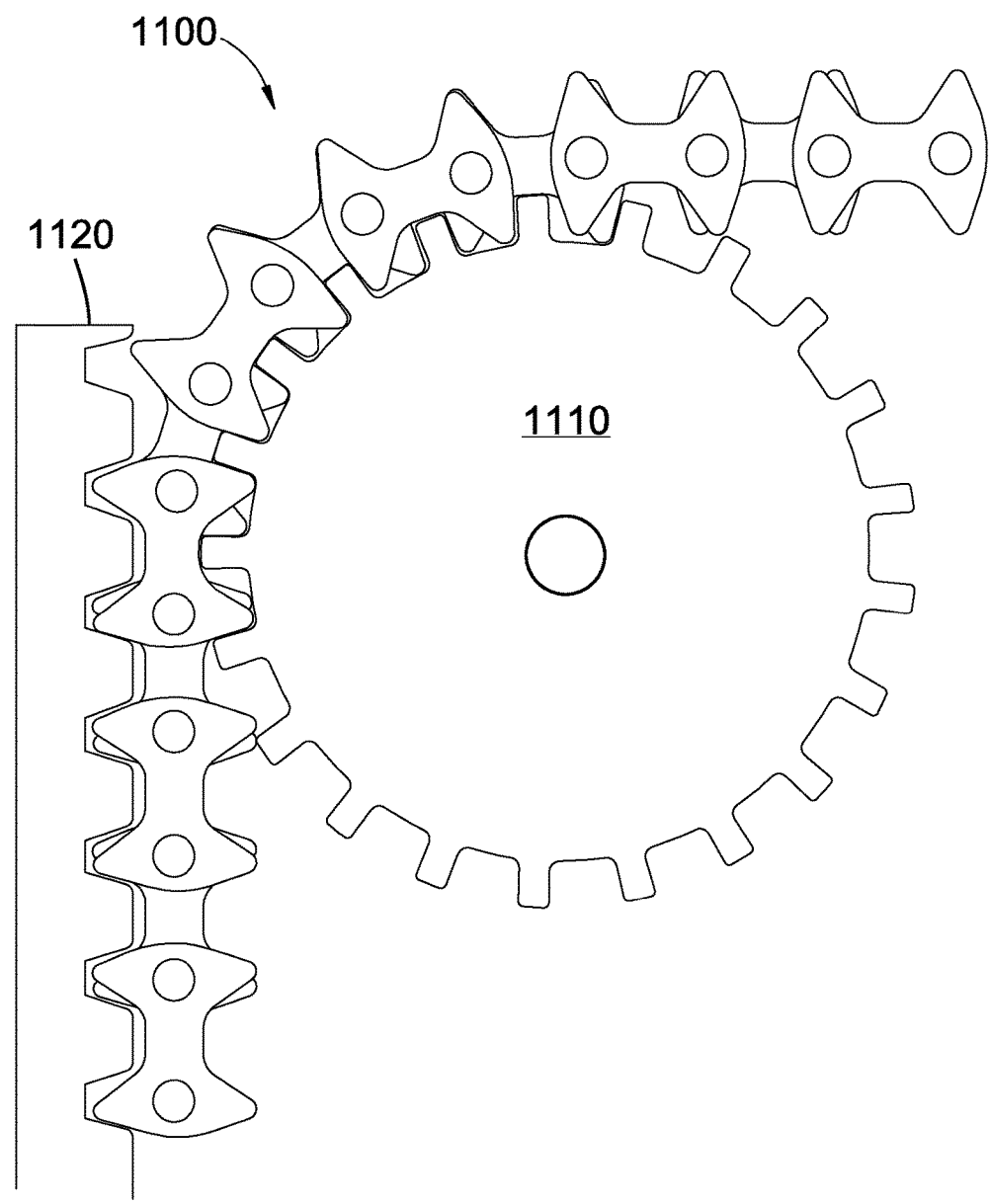
FIG. 11 depicts a perspective view of the invented silent chain profile engaging with both a profile of a sprocket and a rack.

FIG. 11 depicts the profile of silent chain 1100 built in accordance with the invention engaging with both a profile of a sprocket 1110 and a rack 1120. Due to the profile of silent chain 1100, in which the teeth of the link plates are offset when straightened, the silent chain 1100 is able to engage with a sprocket 1110 on the inside and a rack 1120 on the outside at the same time. The sprocket 1110 can be connected to a motor. The motor drives sprocket 1110 and the silent chain 1100, such that the silent chain 1100 moves up the rack 1120, converting rotational motion into linear motion.

Figure 12A:
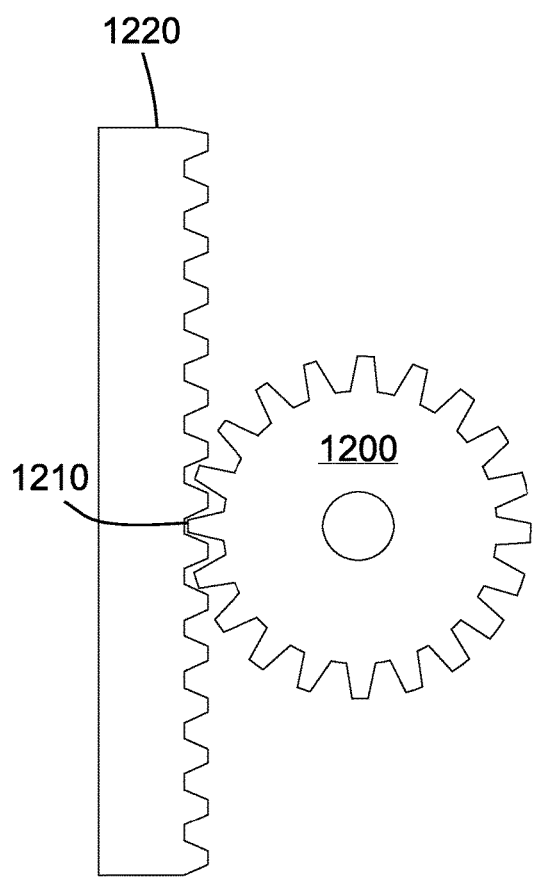
FIG. 12A depicts a perspective view of points of contact between a rack and a pinion.
Figure 12B:
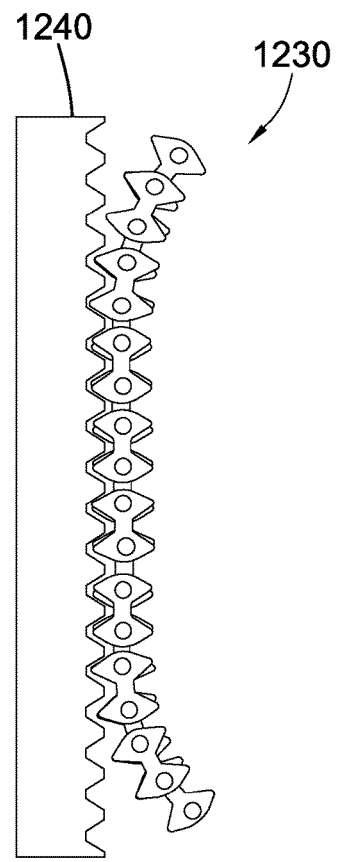
FIG. 12B depicts a perspective view of points of contact between a rack and the invented silent chain.

FIG. 12A and FIG. 12B depict a comparison of points of contact between a rack and pinion device and points of contact between a rack and the silent chain built in accordance with the invention. FIG. 12A depicts an ordinary rack and pinion device. Only a few teeth 1210 of the pinion 1200 make contact with the rack 1220. Due to the small number of points of contact, these points of contact may be put under undue amounts of stress when lifting heavy loads, which could cause the rack and pinion device to fail. On the other hand, FIG. 12B depicts the silent chain 1230 built in accordance with the invention engaged with a rack 1240. In this case, multiple points of contact exist between the rack 1240 and the silent chain 1230. For this reason, the rack and silent chain device is stronger and able to hold more weight. In addition, only small parts are needed, thus increasing the efficiency and decreasing the cost of lifting heavy loads from underneath.

The invention claimed is:

1. A silent chain comprising:
a plurality of first link plates, each first link plate having first and second pin holes and a first and second tooth on an inner side of a line between the first and second pin holes and a third and fourth tooth on an outer side of a line between the first and second pin holes;
a plurality of second link plates, each second link plate having first and second pin holes and a first and second tooth on an inner side of a line between the first and second pin holes and a third and fourth tooth on an outer side of a line between the first and second pin holes;
wherein the silent chain is assembled by connecting first links and second links, wherein the first links are formed by stacks of m first link plates and the second links are formed by stacks of n second link plates, wherein m equals n or n plus one, and wherein the first link plates in the stacks of first link plates are interleaved with the second link plates in the stacks of second link plates, and wherein the first links and second links are connected by pins, some of which pins pass through the first pin holes of the first link plates and through the second pin holes of the second link plates, and other of which pins pass through the second pin hole of the first link plates and through the first pin holes of the second link plates;
wherein the first teeth of the first link plates and the first teeth of the second link plates have an outer edge which is angled to mate with one side of sprocket teeth and wherein the second teeth of the first link plates and the second teeth of the second link plates have an outer edge which is angled to mate with an opposite side of the sprocket teeth, when the silent chain is engaged with the sprocket teeth; and
wherein the third teeth of the first link plates and the third teeth of the second link plates have an outer edge which is angled to mate with one side of rack teeth and wherein the fourth teeth of the first link plates and the fourth teeth of the second link plates have an outer edge which is angled to mate with an opposite side of the rack teeth, when the silent chain is engaged with the rack teeth;
whereby the silent chain meshes with a sprocket and a rack simultaneously.

2. The silent chain of claim 1, wherein a tip of each of the teeth of the first and second link plates forms an angle between about 30 and 80 degrees.

3. The silent chain of claim 1, wherein a tip of each of the teeth of the first and second link plates forms an angle between about 55 and 60 degrees.

4. The silent chain of claim 1, wherein each of the teeth of the first and second link plates extends from a vertical waist of each first and second link plate at an angle between about 100 and 150 degrees.

5. The silent chain of claim 1, wherein each of the teeth of the first and second link plates extends from a vertical waist of each first and second link plate at an angle between about 125 and 130 degrees.

6. The silent chain of claim 1, wherein a distance between central pivot points within each first pin hole and each second pin hole of each first link plate and between central pivot points within each first pin hole and each second pin hole of each second link plate measures 0.5 inches, and wherein a distance between central points of each first tooth and each second tooth and between central points of each third tooth and each fourth teeth of each first link plate and each second link plate measures between about 0.345 and 0.790 inches.

7. The silent chain of claim 1, wherein a distance between central pivot points within each first pin hole and each second pin hole of each first link plate and between central pivot points within each first pin hole and each second pin hole of each second link plate measures 0.5 inches, and wherein a distance between central points of each first tooth and each second tooth and between central points of each third tooth and each fourth teeth of each first link plate and each second link plate measures between about 0.490 and 0.680 inches.

8. The silent chain of claim 1, wherein a distance between central pivot points within each first pin hole and each second pin hole of each first link plate and between central pivot points within each first pin hole and each second pin hole of each second link plate measures 0.5 inches, and wherein a distance between central points of each first tooth and each second tooth and between central points of each third tooth and each fourth teeth of each first link plate and each second link plate measures between about 0.550 and 0.645 inches.

9. The silent chain of claim 1, further comprising center guide link plates, the center guide link plates being positioned centrally within the stacks of first link plates and within the stacks of second link plates, and the center guide link plates being stadium-shaped and having no teeth.

10. The silent chain of claim 1, wherein the pins are rocker pins.

11. The silent chain of claim 1, wherein m equals two.

12. The silent chain of claim 1, wherein m equals three.

13. The silent chain of claim 1, wherein m equals four.

14. The silent chain of claim 1, wherein m equals five.

15. The silent chain of claim 1, wherein m equals six.

16. The silent chain of claim 1, wherein m equals seven.

17. The silent chain of claim 1, wherein m equals eight.

18. The silent chain of claim 1, wherein m equals nine.

19. The silent chain of claim 1, wherein m equals two and n equals one.

\* \* \* \* \*